(12) United States Patent
Bin et al.

(10) Patent No.: US 9,099,145 B1
(45) Date of Patent: Aug. 4, 2015

(54) HIGH CONTRAST ALIGNMENT MARKER

(71) Applicant: Western Digital (Fremont), LLC, Fremont, CA (US)

(72) Inventors: Ouyang Bin, Klong Luang (TH); Chee Kheng Lim, Pakkret (TH)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/216,610

(22) Filed: Mar. 17, 2014

Related U.S. Application Data

(60) Provisional application No. 61/920,577, filed on Dec. 24, 2013.

(51) Int. Cl.
G11B 11/00 (2006.01)
G11B 13/04 (2006.01)

(52) U.S. Cl.
CPC ..................................... G11B 13/04 (2013.01)

(58) Field of Classification Search
None
See application file for complete search history.

(56) References Cited

U.S. PATENT DOCUMENTS

| | | | |
|---|---|---|---|
| 6,075,673 A | 6/2000 | Wilde et al. |
| 6,097,575 A | 8/2000 | Trang et al. |
| 6,125,014 A | 9/2000 | Riedlin, Jr. |
| 6,125,015 A | 9/2000 | Carlson et al. |
| 6,130,863 A | 10/2000 | Wang et al. |
| 6,137,656 A | 10/2000 | Levi et al. |
| 6,144,528 A | 11/2000 | Anaya-Dufresne et al. |
| 6,147,838 A | 11/2000 | Chang et al. |
| 6,151,196 A | 11/2000 | Carlson et al. |
| 6,178,064 B1 | 1/2001 | Chang et al. |
| 6,181,522 B1 | 1/2001 | Carlson |
| 6,181,673 B1 | 1/2001 | Wilde et al. |
| 6,229,672 B1 | 5/2001 | Lee et al. |
| 6,236,543 B1 | 5/2001 | Han et al. |
| 6,246,547 B1 | 6/2001 | Bozorgi et al. |
| 6,249,404 B1 | 6/2001 | Doundakov et al. |
| 6,330,131 B1 | 12/2001 | Nepela et al. |
| 6,339,518 B1 | 1/2002 | Chang et al. |
| 6,349,017 B1 | 2/2002 | Schott |
| 6,373,660 B1 | 4/2002 | Lam et al. |
| 6,378,195 B1 | 4/2002 | Carlson |
| 6,522,504 B1 | 2/2003 | Casey |
| 6,538,850 B1 | 3/2003 | Hadian et al. |
| 6,583,953 B1 | 6/2003 | Han et al. |
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,690,545 B1 | 2/2004 | Chang et al. |
| 6,704,173 B1 | 3/2004 | Lam et al. |
| 6,708,389 B1 | 3/2004 | Carlson et al. |

(Continued)

OTHER PUBLICATIONS

U.S. Appl. No. 13/969,782, filed Aug. 19, 2013, to Chee Kheng Lim, 16 pages.

Primary Examiner — Thang Tran

(57) ABSTRACT

A slider and method of making same to reduce contrast interference for visual identification of alignment marks on the slider for heat assisted magnetic recording (HAMR) includes a plurality of alignment marks arranged for alignment of a chip on submount assembly (COSA) with respect to the slider, and at least one shield arranged with the plurality of alignment marks. A hard disk drive includes a plurality of alignment marks arranged for alignment of a chip on submount assembly (COSA) with respect to the slider, and at least one shield arranged with the plurality of alignment marks.

23 Claims, 8 Drawing Sheets

(56) References Cited

U.S. PATENT DOCUMENTS

| | | |
|---|---|---|
| 6,717,773 B2 | 4/2004 | Hawwa et al. |
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,174,622 B2 | 2/2007 | Meyer et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,333,175 B2 | 2/2008 | Baselmans |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,729,089 B1 | 6/2010 | Hogan |
| 7,791,212 B2 | 9/2010 | Takahashi et al. |
| 7,804,656 B2 | 9/2010 | Gomez et al. |
| 7,821,880 B2 | 10/2010 | Tanaka et al. |
| 7,924,658 B2 | 4/2011 | Shimazawa et al. |
| 7,930,817 B2 | 4/2011 | Takayama et al. |
| 7,957,099 B2 | 6/2011 | Tanaka et al. |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,149,653 B2 | 4/2012 | Shimazawa et al. |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,248,898 B2 | 8/2012 | Schreck et al. |
| 8,254,212 B2 | 8/2012 | Snyder et al. |
| 8,256,272 B1 | 9/2012 | Roajanasiri et al. |
| 8,274,867 B2 | 9/2012 | Mori et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,339,905 B2 | 12/2012 | Rausch et al. |
| 8,341,825 B2 | 1/2013 | Hara et al. |
| 8,343,363 B1 | 1/2013 | Pakpum et al. |
| 8,345,517 B2 | 1/2013 | Hurley et al. |
| 8,345,519 B1 | 1/2013 | Pan |
| 8,385,183 B2 | 2/2013 | Peng et al. |
| 8,418,353 B1 | 4/2013 | Moravec et al. |
| 8,424,191 B2 | 4/2013 | Shimazawa et al. |
| 8,437,228 B2 | 5/2013 | Matsushima et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,456,961 B1 * | 6/2013 | Wang et al. ................ 369/13.01 |
| 8,462,462 B1 | 6/2013 | Moravec et al. |
| 8,477,459 B1 | 7/2013 | Pan |
| 8,477,571 B1 | 7/2013 | Zhou et al. |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 * | 7/2014 | Wang et al. ................ 356/401 |
| 8,792,212 B1 | 7/2014 | Pan et al. |
| 8,792,213 B1 | 7/2014 | Vijay et al. |
| 8,797,691 B1 | 8/2014 | Tian et al. |
| 2008/0056073 A1 * | 3/2008 | Shimizu ................ 369/13.02 |
| 2008/0304802 A1 * | 12/2008 | Watanabe et al. ............ 385/134 |
| 2009/0116803 A1 * | 5/2009 | Watanabe et al. ............ 385/129 |
| 2010/0008622 A1 * | 1/2010 | Watanabe ................ 385/14 |
| 2010/0085846 A1 * | 4/2010 | Shimazawa et al. ........ 369/13.14 |
| 2011/0157738 A1 * | 6/2011 | Shimazawa et al. ............ 360/59 |
| 2012/0163137 A1 * | 6/2012 | Wang et al. ................ 369/13.02 |
| 2013/0244541 A1 | 9/2013 | Yaemglin et al. |
| 2013/0293982 A1 | 11/2013 | Huber |

\* cited by examiner

HIGH CONTRAST ALIGNMENT MARKER

CROSS-REFERENCE TO RELATED APPLICATION(S)

This application claims the benefit of U.S. Provisional Application Ser. No. 61/920,577, filed on Dec. 24, 2013, which is expressly incorporated by reference herein in its entirety.

BACKGROUND

The disclosure relates to heat assisted magnetic recording (HAMR), and particularly to alignment features and assembly methods to improve placement accuracy of a laser Chip-On-Submount Assembly (COSA) on a magnetic recording write head assembly.

Information storage devices are used to retrieve and/or store data in computers and other consumer electronics devices. Energy assisted magnetic recording (EAMR) or heat assisted magnetic recording (HAMR) technology may be used to increase areal density (AD) of hard disks.

Heat assisted magnetic recording technology requires a laser source to provide additional energy during the data writing process. The energy source normally comes from a semiconductor laser diode chip bonded on a submount assembly which is referred to as the Chip-On-Submount-Assembly (COSA). The COSA is attached to the back of a conventional magnetic head slider and the light energy from the laser diode chip is guided to an air bearing surface (ABS) through a waveguide to heat up the magnetic media. Heat from the laser beam lowers the coercivity of the magnetic medium and enables a write pole to magnetize the media with high density, which helps to realize the magnetic recording process with increased AD.

Efficient coupling of the laser beam with the optical waveguide enables writing data at high density to the disk. A requirement for bonding the COSA to the slider is the accuracy which must be achieved, typically at a submicron level. The bonding process itself can be a eutectic or epoxy type attachment. Accurate bonding helps to ensure that the output of the laser diode is aligned to the entry point of the waveguide attached to the slider. The alignment accuracy defines the amount of energy channeled into the waveguide and therefore an efficiency of the whole assembly. When the alignment is poor, more energy is needed from the laser diode to ensure sufficient energy is channeled through the waveguide. Poor alignment leads to low energy efficiency and potential degradation of laser life due to higher required output.

Submicron bonding accuracy presents a significance technological challenge to achieve high speed bonding. Conventionally, there are two methods to achieve high accuracy bonding (submicron). One is passive alignment method which relies on alignment markers and the other is active alignment. In the active alignment method, the laser diode is powered up and the alignment position is searched by scanning the laser diode beam across the waveguide area to identify the optimum position.

A requirement for passive alignment is the visibility of alignment markers on the slider and COSA device. For reliable passive alignment, vision recognition and detection via a high resolution camera requires high contrast between alignment markers and the surrounding regions of the COSA and slider. However, in prior systems, it is difficult for the high resolution camera to properly recognize and detect the markers because of the reflection/interference caused by other components near the markers. A significant problem with conventional marker design is due to the interference of background features which may seriously affect machine vision marker location recognition. The transparent alumina may also contribute to the interference of the background features. The degree of interference may increase with increasing alumina thickness. For example, with a slider thickness of 172 um, the background feature interference appears with brightness comparable to the actual alignment markers, and may seriously impact the machine vision's capability to correctly recognize the alignment markers.

Hence there is a need in the art of passive alignment for methods and structures to facilitate alignment of the laser COSA with the optical waveguide to obtain an optimized optical energy coupling using machine vision recognition.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
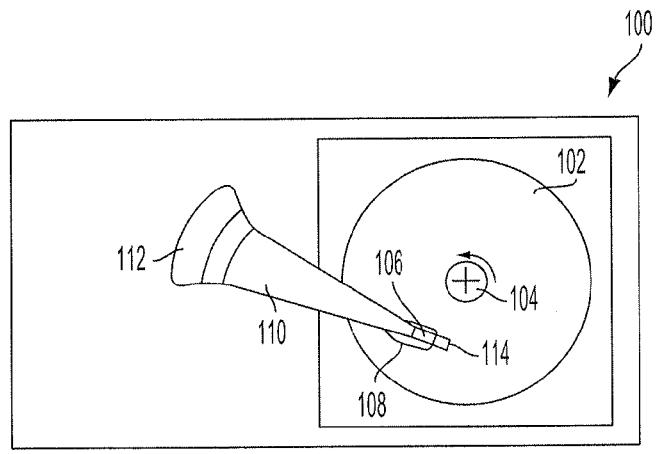
FIG. 1 is a plan view of an exemplary embodiment of a HAMR disk drive.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus or method.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus, method or article of manufacture does not require that all embodiments of the invention include the described components, structure, features, functionality, processes, advantages, benefits, or modes of operation.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As used herein, the terms "comprises," "comprising," "includes," and/or "including," when used herein, specify the presence of the stated features, integers, steps, operations, elements, and/or components, but do not preclude the presence or addition of one or more other features, integers, steps, operations, elements, components, and/or groups thereof.

In the following detailed description, various aspects of the present invention will be presented in the context of apparatuses and methods to improve alignment of a laser COSA with an optical waveguide on a slider of a magnetic disk drive write head assembly. However, those skilled in the art will realize that these aspects may be extended to any suitable application where high contrast markers may be used to assist or facilitate a machine in the alignment or placement of a structure, component, or part, onto an apparatus. Accordingly, any reference to a process for improving alignment of a laser COSA with an optical waveguide on a slider is intended only to illustrate the various aspects of the present invention, with the understanding that such aspects may have a wide range of applications.

Aspects of a slider for heat assisted magnetic recording will now be presented. In several exemplary embodiments, the slider may include a plurality of alignment marks arranged for alignment of a COSA with respect to the slider, and at least one shield arranged with the plurality of alignment marks.

Aspects of a method of making a slider for heat assisted magnetic recording will also be presented. In several exemplary embodiments, the method may include forming a plurality of alignment marks arranged for alignment of a chip on submount assembly (COSA) with respect to the slider, and forming at least one shield arranged with the plurality of alignment marks.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive FIG. 1 is a conceptual plan view of an exemplary embodiment of a HAMR disk drive. The HAMR disk drive 100 is shown with a rotatable magnetic disk 102. The magnetic disk 102 may be rotated on a spindle 104 by a disk drive motor (not shown) located under the magnetic disk 102. A head 106 may include read and write poles (not shown) that detect and modify the magnetic polarization of the recording layer on the disk's surface. The head 106 is generally integrally formed with a slider 108. The function of the slider 108 is to support the head 106 and any electrical connections between the head 106 and the rest of the HAMR disk drive 100. The slider 108 is mounted to a positioner arm 110 which may be used to move the head 106 on an arc across the rotating magnetic disk 102, thereby allowing the head 106 to access the entire surface of the magnetic disk 102. The arm 110 may be moved using a voice coil actuator 112 or by some other suitable means.

The slider is aerodynamically designed to fly above the magnetic disk 102 by virtue of an air bearing created between the surface of the slider 106 and the rotating magnetic disk 102. This surface of the slider 108 is referred to as an air bearing surface (ABS). The ABS is the portion of the slider 108 surface which is closest to the rotating magnetic disk 102, which is typically the head 104. A HAMR transducer 114 may be coupled to the trailing edge of the slider 108 to assist writing data to the magnetic disk 102. Light from a laser diode is coupled to the HAMR transducer 114 and guided by waveguide (not shown) to the magnetic disk 102 to heat a small region of the media. The head 106 magnetically writes data to the heated region of the media by energizing the write pole. When the laser diode, as the heat source, is turned off, the localized magnetic media cools and the written bit becomes thermally stable at ambient temperature.

Figure 2:
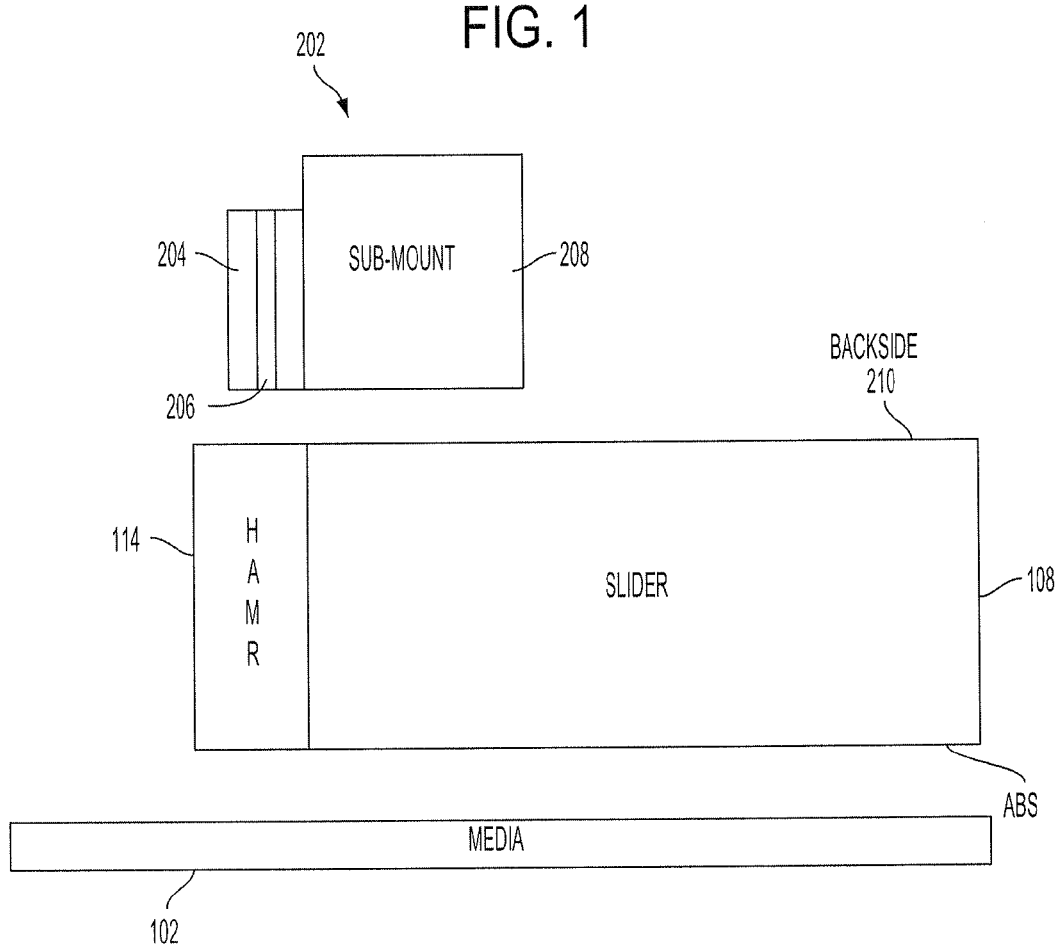
FIG. 2 is an elevation view of an exemplary embodiment of a HAMR transducer residing on a slider for a HAMR disk drive.

FIG. 2 is an elevation view of an exemplary embodiment of a HAMR transducer arranged with a slider for a HAMR disk drive. The HAMR disk drive 100 includes the magnetic disk 102, a chip on a subassembly (COSA) 202 and a slider 108 on which a HAMR transducer 114 is formed. The COSA 202 includes a light source, such as a laser diode 204 having an emission exit 206, attached to a submount 208. The slider 108 has a back side 210 to which the COSA 202 may be bonded, and an ABS. In the embodiment shown, the back side 210 is opposite to the ABS. However, in other embodiments, the back side 210 (i.e. the side to which the submount is bonded) may not be opposite to the ABS.

Various aspects of methods and apparatuses will now be presented for achieving high precision passive alignment of a laser diode on a slider using high contrast alignment markers. High contrast alignment markers may improve the machine vision ability to recognize and search for the correct alignment.

Figure 3A:
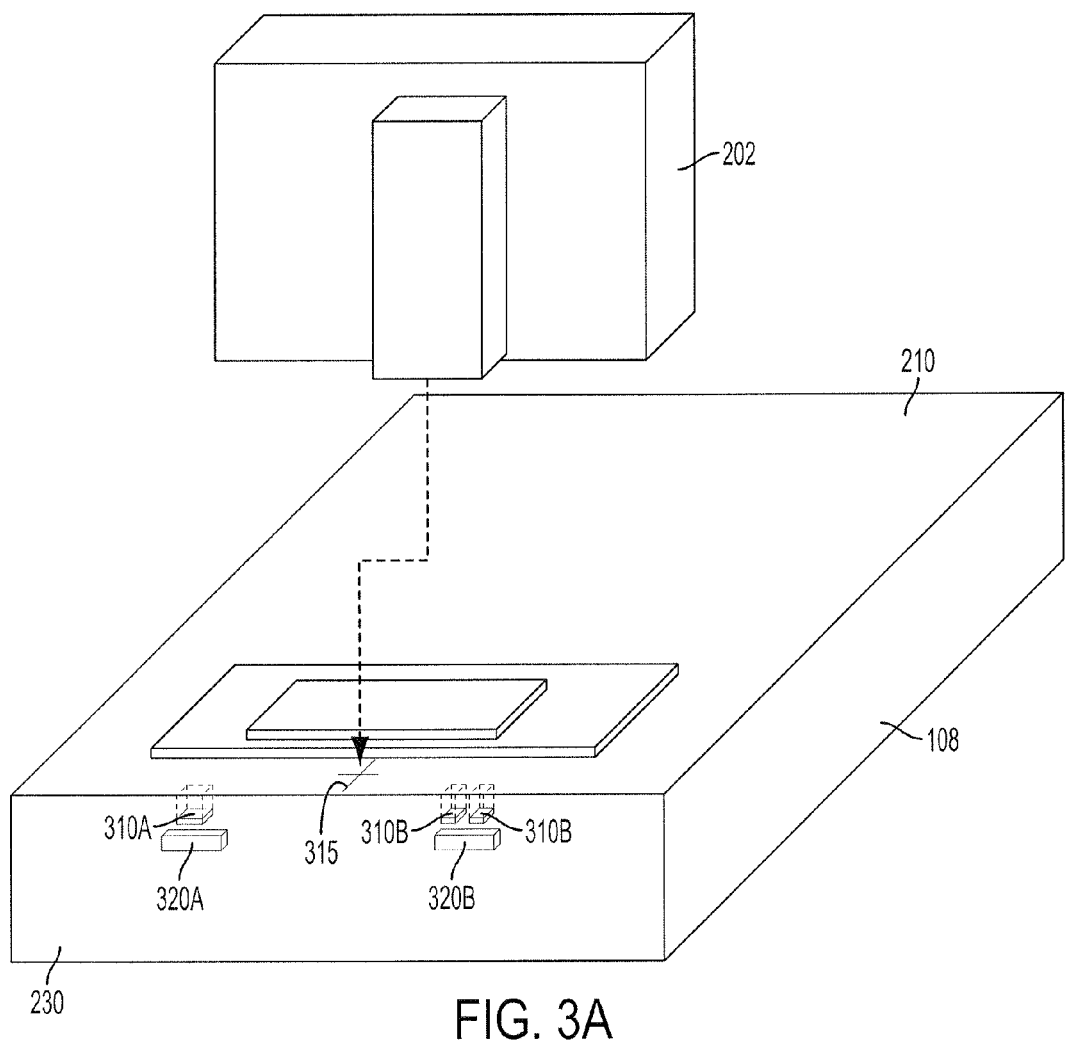
FIG. 3A is a perspective view of an exemplary embodiment of a slider prior to alignment of the COSA.
Figure 3B:
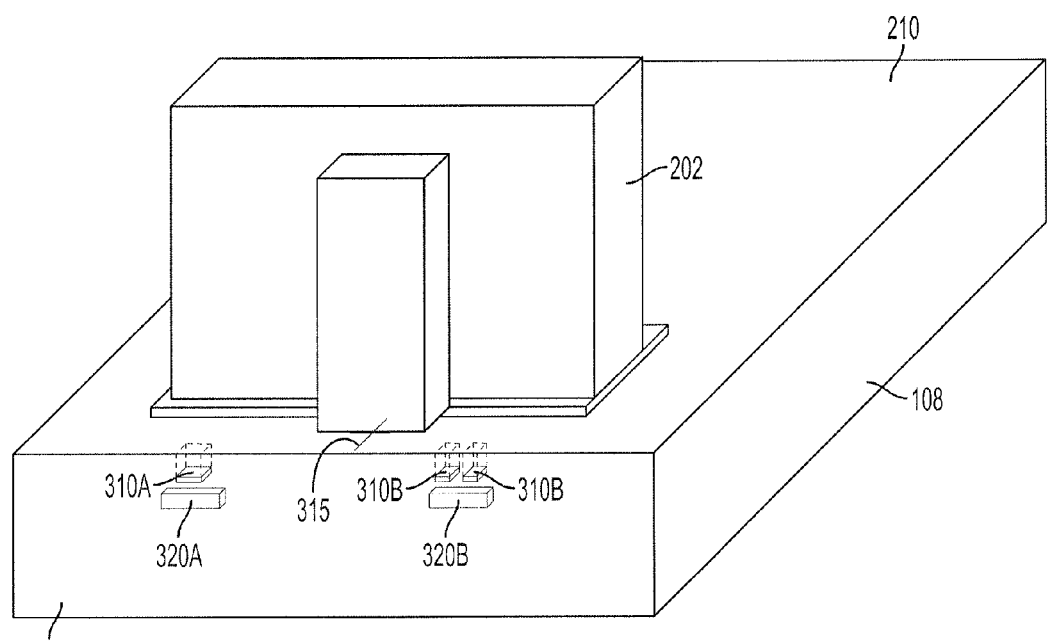
FIG. 3B is a perspective view of the exemplary embodiment of the slider of FIG. 3A after installation of the COSA.

FIGS. 3A and 3B are perspective views showing the alignment and bonding processes, which may be accomplished with the aid of a machine vision system. FIG. 3A shows the positioning of the COSA 202 over the center point 315 between the two alignment markers 310A, 310B, with shields 320A, 320B associated with the markers. FIG. 3B shows the step of bonding the COSA 202 to the slider 108 after alignment on the basis of the calculated center point 315.

As shown in FIGS. 3A and 3B the alignment markers 310A, 310B and the shields 320A, 320B may be positioned on or adjacent to an edge 230 that extends between the back side 210 of the slider 108 and the ABS. The edge 230 may be the trailing edge of the slider 108. In another example embodiment, the edge 230 may be the leading edge of the slider 108. For clarity, the distance from the alignment markers 320A, 320B and the shields 320A, 320B to the back side 210 is exaggerated in all of the figures. The alignment markers 320A, 320B may be placed such they are nearly touching the back side 210. As represented by dashed line in FIGS. 3A and 3B, the reflections of the markers 310A, 310B are viewable when looking down on the back side 210 due to the transparency of the back side 210. The reflection is discussed in more detail below in conjunction with FIG. 5. The alignment markers 310A, 310B may typically be made of gold, gold alloy or other bright high reflectivity material.

In operation, the laser beam is directed downward toward the back side 210. From this viewing perspective (i.e., looking down on the back side 210) below the alignment markers 310A, 310B, are portions of the optical circuitry of the HAMR transducer and the write pole of the head. For example, the head may include a read head a write head. The write head may include a main pole coupled to an auxiliary pole by a yoke. A thin film coil may be positioned between the main and auxiliary poles. The coil may extend to an external energy source. The above components, among others, may cause reflection/interference inhibiting the ability of the high resolution camera to properly recognize and detect the markers. During alignment, the COSA 202 may be placed over the slider 108 to position the laser diode emission exit 206 at the calculated center point 315, which is the entrance to the waveguide in the HAMR transducer 114. As shown in FIGS. 3A and 3B, the shields 320A, 320B are positioned just below (from the perspective of looking down on the back side 210) the alignment markers 310A, 310B. The shields 320A, 320B, which are made of a material that contrasts with the markers, block the interference caused by the above-mentioned components. In other words, the shields 310A, 310B isolate machine vision images of the alignment markers from background interference and therefore improve alignment accuracy.

Figure 4:
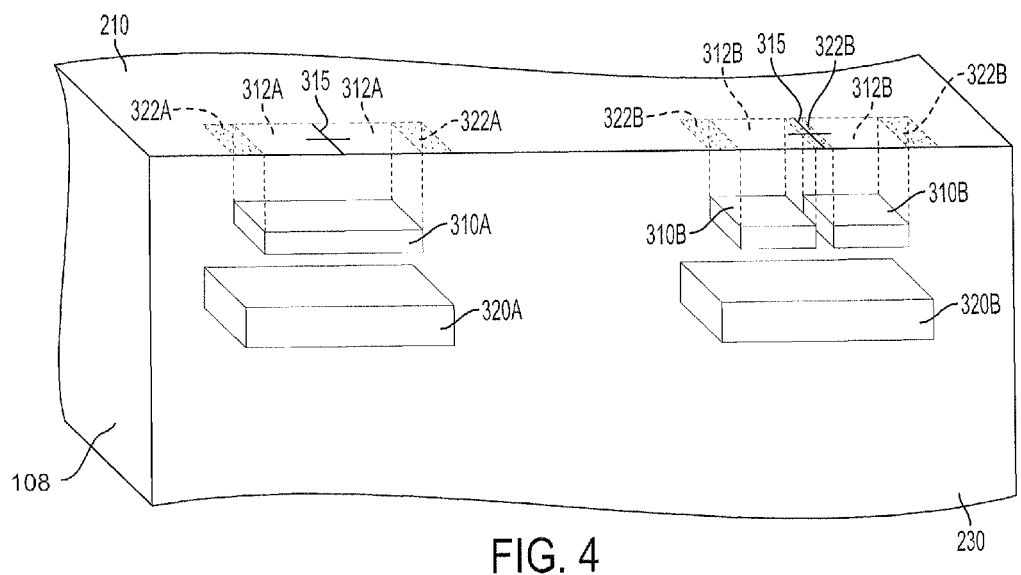
FIG. 4 is close up perspective view of the trailing edge of the exemplary embodiment of the slider of FIGS. 3A and 3B showing high contrast features on the slider.

FIG. 4 is a close up perspective view showing the effect of forming high contrast shields 320A, 320B on or adjacent to the edge 230 of slider, when viewed from the back side 210. The dashed line on the back side 210 represent the reflection 312A, 312B viewable from the back side 210, while the darker regions represented by dashed lines 322A, 322B represents the reflection blocked by the shields 320A, 320B. The shields 320A, 320B thus may be used to eliminate background feature visual interference. It may be seen in FIG. 5 that the alignment markers 310A, 310B are laterally flanked by dark regions 322A, 322B. Total suppression of visual interference may not be completely achieved if the lengths of the shields 320A, 320B are not great enough to completely block secondary reflected images of the alignment markers 310A, 310B. This would appear as a fainter reflection just outside of the laterally flanked dark regions 322A, 322B. However, this may not be a problem for a machine vision system, because the remnant secondary reflected images have different shapes than the alignment markers due to the inclusion of the shields 320A, 320B. Accordingly, a machine vision system may be able to distinguish the correct feature on the basis of expected size of the alignment markers 310A, 310B. As shown by the crosshairs of the machine vision system, the centers of each of the alignment markers 315 may be correctly found.

In an alternative exemplary embodiment, a single elongated shield may laterally extend as a single element behind and across both alignment markers 310A, 310B to increase the suppression of visual interference. In other words, while multiple shields are shown in the example figures, a single continuous shield may also be used.

Figure 5:
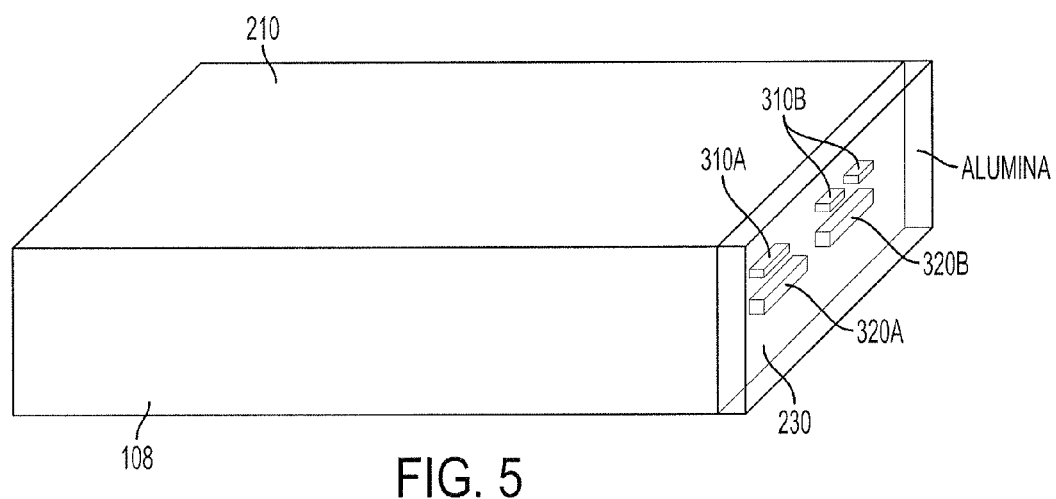
FIG. 5 is a side perspective view of the exemplary embodiment of the slider of FIGS. 3A and 3B.

FIG. 5 is a side perspective view of an exemplary embodiment of an arrangement of alignment markers 310A, 310B and shields 320A, 320B on the edge 230 of the slider 108. As shown in FIG. 5, the alignment markers 310A, 310B and shields 320A, 320B may be encapsulated in a layer of transparent material, such as alumina. As noted above, the shields 320A, 320B improve visual contrast when viewed from back side 210 of the slider. As also noted above, in an alternative embodiment, the shields 320A, 320B may be a single shield of extended length.

FIGS. 6A-6E illustrate exemplary steps in a method to fabricate shields 320A, 320B on a slider 108. In process step 1, shown in FIG. 6A, alignment markers 310A, 310B may be fabricated on the edge 230 (e.g., the trailing edge) of the slider 108 using any suitable method known in the art. The alignment markers 310A, 310B may include a high brightness material, such as gold, for instance, formed by metallization and photolithographic patterning.

Figure 6A:
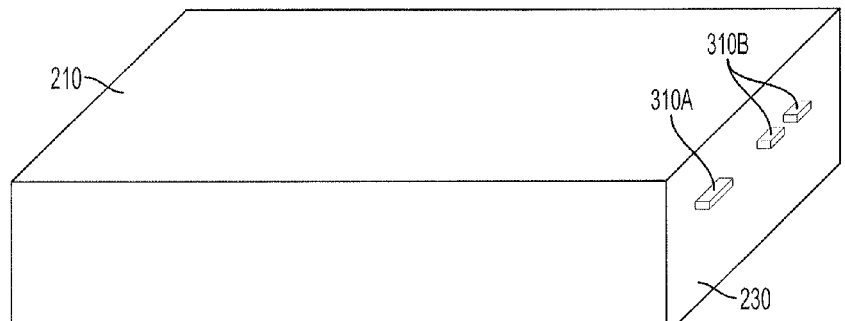
FIGS. 6A-6E illustrate steps in an exemplary embodiment of a method to fabricate shields on a slider.
Figure 6B:
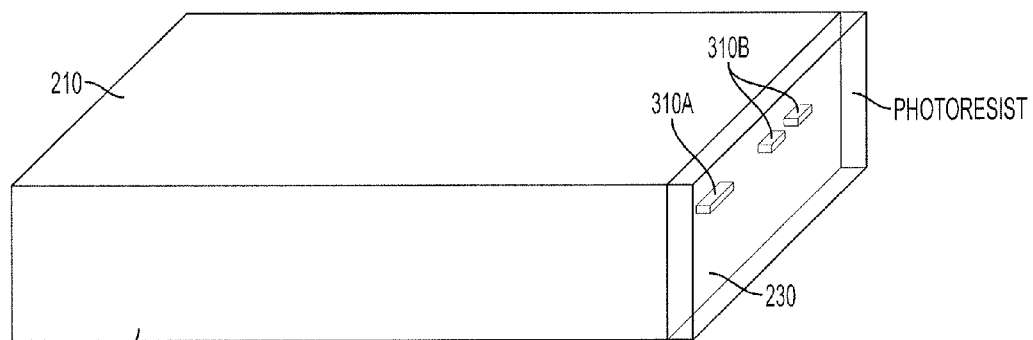

In process step 2, shown in FIG. 6B, a layer of photoresist may be deposited on the edge 230 of the slider 108, over coating the alignment markers 310A, 310B.

Figure 6C:
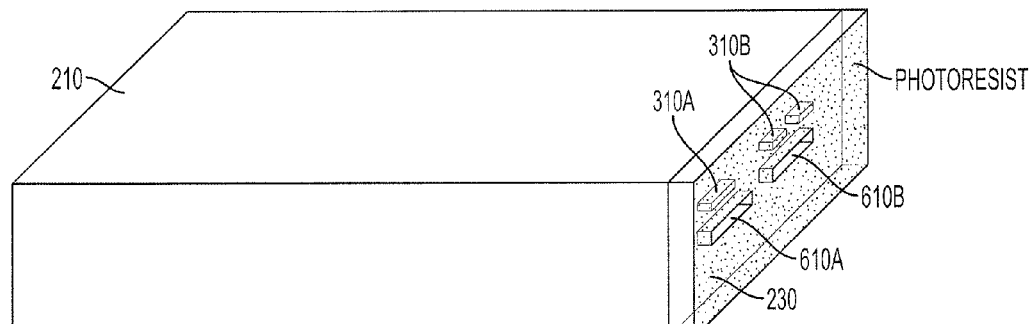

In process step 3, shown in FIG. 6C, using photolithography, windows 610A, 610B may be formed in the photoresist at the locations where the shields will be formed. The windows 610A, 610B are shown as two rectangles, however other shapes may be patterned.

Figure 6D:
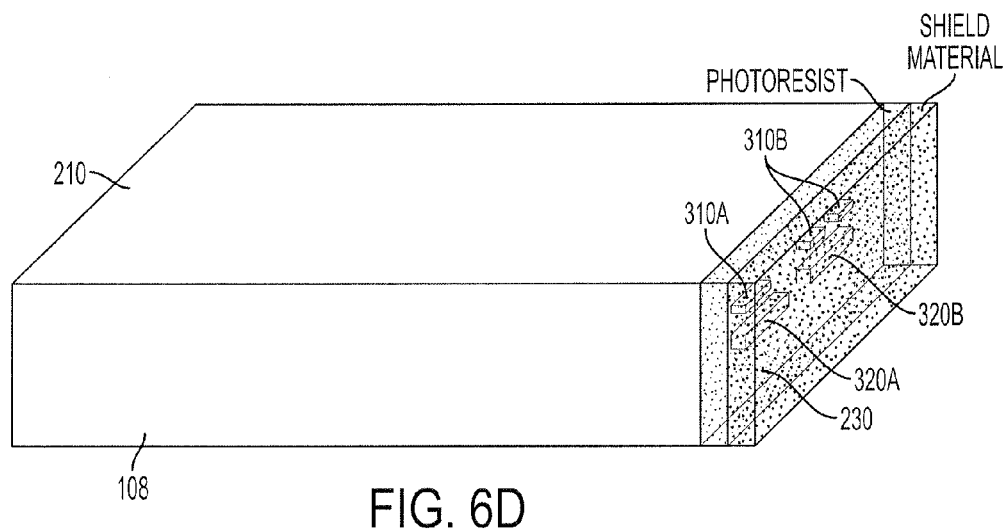

In process step 4, shown in FIG. 6D, shield material, having a dark, low reflectivity appearance, may be deposited over the photoresist and opened windows.

Figure 6E:
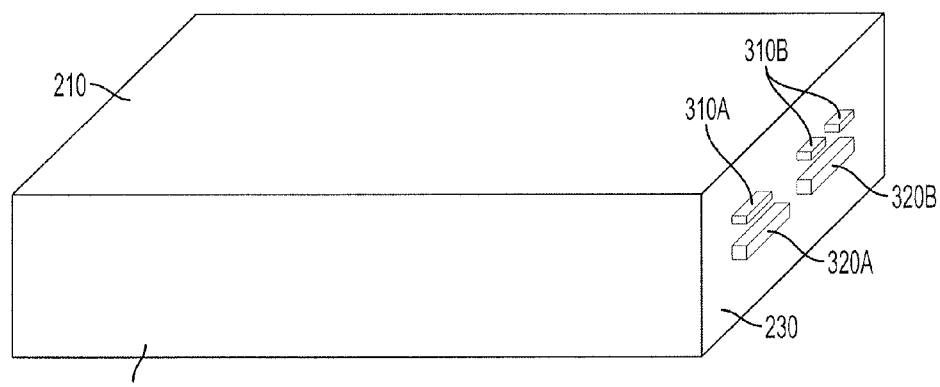

In process step 5, shown in FIG. 6E, a photoresist liftoff process may be used to remove the photoresist and any shield material deposited thereon. When viewed top-down toward the back side 210 surface of the slider, the alignment markers 310A, 310B appear with a dark background provided by the shields 320A, 320B. The shields 320A, 320B are preferably wider than the alignment markers 310A, 310B to provide an adequately large dark background to enhance contrast (as shown in FIG. 4). In one exemplary embodiment, the shields 320A, 320B, may be at least 15 um wider than the width extent of the corresponding alignment markers 310A, 310B, however, a different overlapping dimension may be specified. In a subsequent step, an alumina layer may be deposited over the alignment markers 310A, 310B and shields 320A, 320B (e.g., arriving at the example embodiment shown in FIG. 5).

Figure 7:
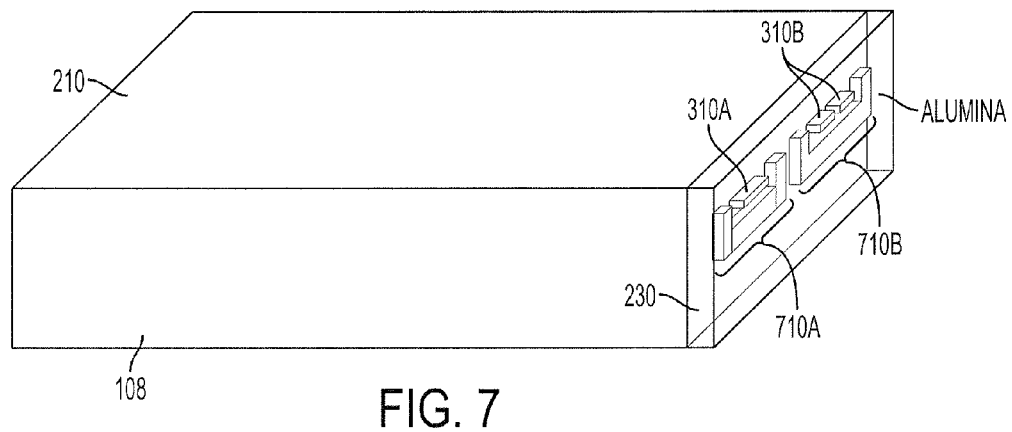
FIG. 7 is a perspective view of another exemplary embodiment of shields formed on a slider to enhance contrast of alignment marks.

FIG. 7 is a schematic illustration of another exemplary embodiment of shields 710A, 710B formed on a slider to enhance contrast of alignment marks. In the embodiment shown, each shield 710A, 710B is formed as a "U" about each alignment marker 310A, 310B to provide a more comprehensive isolation of the alignment markers from background interference when viewed from the back side 210 surface of the slider 108. Steps in the method of forming the shields 710A, 710B are the same as described for FIGS. 6A-6E, where the photolithographic mask used in step 3 provides masking to form the "U" shape.

It should be noted that FIGS. 3A to 7 are not drawn to scale. For example, the slider thickness may be on the order of $10^2$ microns (e.g., between 170-200 microns), while the dimensions of the markers and shields may be on the order of $10^0$ to $10^1$ microns. Similarly, the distance of the markers/shields from the line where the back surface meets the trailing edge is exaggerated for clarity. For example, the markers and shields may be formed on the trailing edge within a few microns from the line where the back surface meets the trailing edge.

Figure 8:
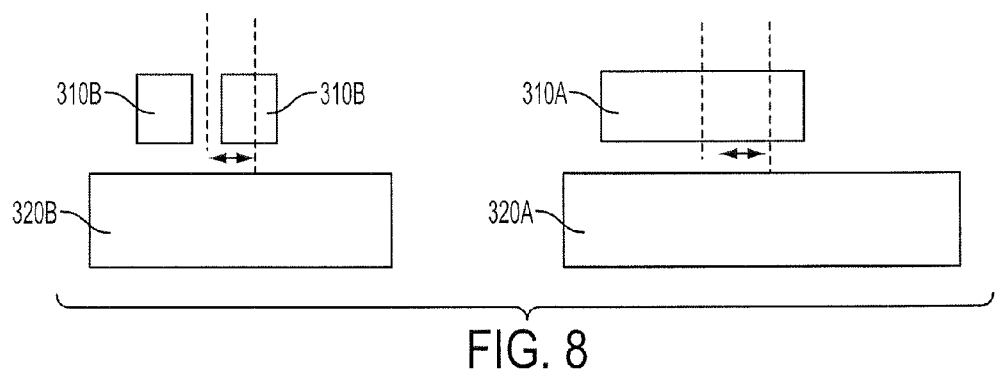
FIG. 8 is a schematic representation of overlay error of an exemplary embodiment of the shields with respect to the center of the respective alignment.

FIG. 8 is a schematic illustration of location error of the shields that may during fabrication with respect to the center of respective alignment marks. The shields may be preferably positioned behind respective alignment marks to provide adequate contrast so that machine vision may more accurately and correctly identify the calculate the alignment marks, calculate the center position, and place the COSA accordingly. There is some margin for error in placement of the shields, provided the contrast is sufficiently enhanced and the shields are of sufficient dimension. A statistical yield of the dependence of accuracy of placement of COSAs on sliders may depend on slider thickness, shield dimensions, and accuracy of placement of the shields with respect to the alignment marks.

It may be appreciated that the improvement in contrast may have beneficial results for the accuracy of machine vision detection and location of the COSA on the slider, specifically with respect to slider yield and HAMR efficiency and laser lifetime.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A slider for heat assisted magnetic recording (HAMR), comprising:
   a plurality of alignment marks arranged for alignment of a chip on submount assembly (COSA) with respect to the slider; and
   at least one shield arranged with the plurality of alignment marks, wherein the at least one shield and the plurality of the alignment marks are used for passive alignment, wherein the at least one shield is arranged to shield the plurality of alignment marks from any background features visual interference, and wherein the at least one shield laterally flanks all of the plurality of alignment marks.

2. A slider for heat assisted magnetic recording (HAMR), comprising:
   a plurality of alignment marks arranged for alignment of a chip on submount assembly (COSA) with respect to the slider; and
   at least one shield arranged with the plurality of alignment marks, wherein each of the alignment marks comprises a contrast, and wherein the at least one shield comprises a contrast lower than the contrast of each of the alignment marks.

3. The slider of claim 2, wherein the at least one shield is darker than each of the alignment marks.

4. The slider of claim 2, wherein the at least one shield contrasts a brightness of the plurality of alignment marks.

5. The slider of claim 2,
   further comprising an air bearing surface (ABS), a back surface opposite the ABS, and an edge extending between the ABS and the back surface; and
   wherein the plurality of alignment marks are arranged adjacent the edge of the slider.

6. The slider of claim 2,
   further comprising an air bearing surface (ABS), a back surface opposite the ABS, and an edge extending between the ABS and the back surface,
   wherein the at least one shield comprises a plurality of shields, each shield of the plurality of shields being arranged with a respective one of the plurality of alignment marks, and
   wherein each of the shields forms a "U" shape surrounding its respective one of the alignment marks on three sides in the plane of the edge of the slider.

7. The slider of claim 2, wherein the alignment marks include first and second alignment marks, wherein the first alignment mark is a single element and the second alignment mark is two elements.

8. A hard disk drive comprising:
   a rotatable magnetic recording disk; and
   a slider for heat assisted magnetic recording (HAMR) to the magnetic recording disk, the slider comprising:
      a plurality of alignment marks arranged for alignment of a chip on submount assembly (COSA) with respect to the slider; and
      at least one shield arranged with the plurality of alignment marks, wherein the at least one shield is arranged to shield the plurality of alignment marks from any background features visual interference, and wherein the at least one shield laterally flanks all of the plurality of alignment marks.

9. A hard disk drive comprising:
   a rotatable magnetic recording disk; and
   a slider for heat assisted magnetic recording (HAMR) to the magnetic recording disk, the slider comprising:
      a plurality of alignment marks arranged for alignment of a chip on submount assembly (COSA) with respect to the slider; and
      at least one shield arranged with the plurality of alignment marks, wherein each of the alignment marks comprises a contrast, and the at least one shield comprises a contrast lower than the contrast of each of the alignment marks.

10. The hard disk drive of claim 9, wherein the at least one shield is darker than the plurality of alignment marks.

11. The hard disk drive of claim 9, wherein the at least one shield contrasts a brightness of the plurality of alignment marks.

12. The hard disk drive of claim 9, wherein the slider further comprises an air bearing surface (ABS), a back surface opposite the ABS, and an edge extending between the ABS and the back surface, and wherein the plurality of alignment marks are arranged adjacent the edge of the slider.

13. The hard disk drive of claim 9, wherein the slider further comprises an air bearing surface (ABS), a back surface opposite the ABS, and an edge extending between the ABS and the back surface, wherein the at least one shield comprises a plurality of shields, each shield of the plurality of shields being arranged with a respective one of the plurality of alignment marks, and wherein each of the shields forms a "U" shape surrounding its respective one of the alignment marks on three sides in the plane of the edge of the slider.

14. The hard disk drive of claim 9, wherein the plurality of alignment marks include first and second alignment marks, wherein the first alignment mark is a single element and the second alignment mark is two elements.

15. An apparatus, comprising:
   a plurality of alignment marks arranged for alignment of an object with respect to the apparatus;
   a component; and at least one shield arranged with the plurality of alignment marks such that the at least one shield blocks light reflecting from the component, and wherein the at least one shield laterally flanks all of the plurality of alignment marks, and wherein the at least one shield and the plurality of the alignment marks are used for passive alignment.

16. An apparatus, comprising:
a plurality of alignment marks arranged for alignment of an object with respect to the apparatus;
a component; and
at least one shield arranged with the plurality of alignment marks such that the at least one shield blocks light reflecting from the component, wherein each of the alignment marks comprises a contrast, and wherein the at least one shield comprises a contrast lower than the contrast of each of the alignment marks.

17. The apparatus of claim 16, wherein the at least one shield is darker than each of the alignment marks.

18. The apparatus of claim 16, wherein the at least one shield contrasts a brightness the plurality of alignment marks.

19. The apparatus of claim 16,
further comprising a first surface, a back surface opposite the first surface, and an edge extending between the first surface and the back surface; and
wherein the plurality of alignment marks are arranged adjacent the edge of the apparatus.

20. The apparatus of claim 16,
further comprising a first surface, a back surface opposite the first surface, and an edge extending between the first surface and the back surface,
wherein the at least one shield comprises a plurality of shields, each shield of the plurality of shields being arranged with a respective one of the plurality of alignment marks, and
wherein each of the shields forms a "U" shape surrounding its respective one of the alignment marks on three sides in the plane of the edge of the apparatus.

21. The apparatus of claim 16, wherein the alignment marks include first and second alignment marks, wherein the first alignment mark is a single element and the second alignment mark is two elements.

22. The slider of claim 7, wherein a total width of the at least one shield is longer than the total width of the first and second alignment marks and a width of any gap between the two elements of the second alignment mark.

23. The hard disk drive of claim 14, wherein a total width of the at least one shield is longer than the total width of the first and second alignment marks and a width of any gap between the two elements of the second alignment mark.

* * * * *